Jan. 13, 1953  J. C. FLANSBURGH  2,625,344
ELECTRIC CORD HANDLING APPARATUS
Filed March 8, 1950
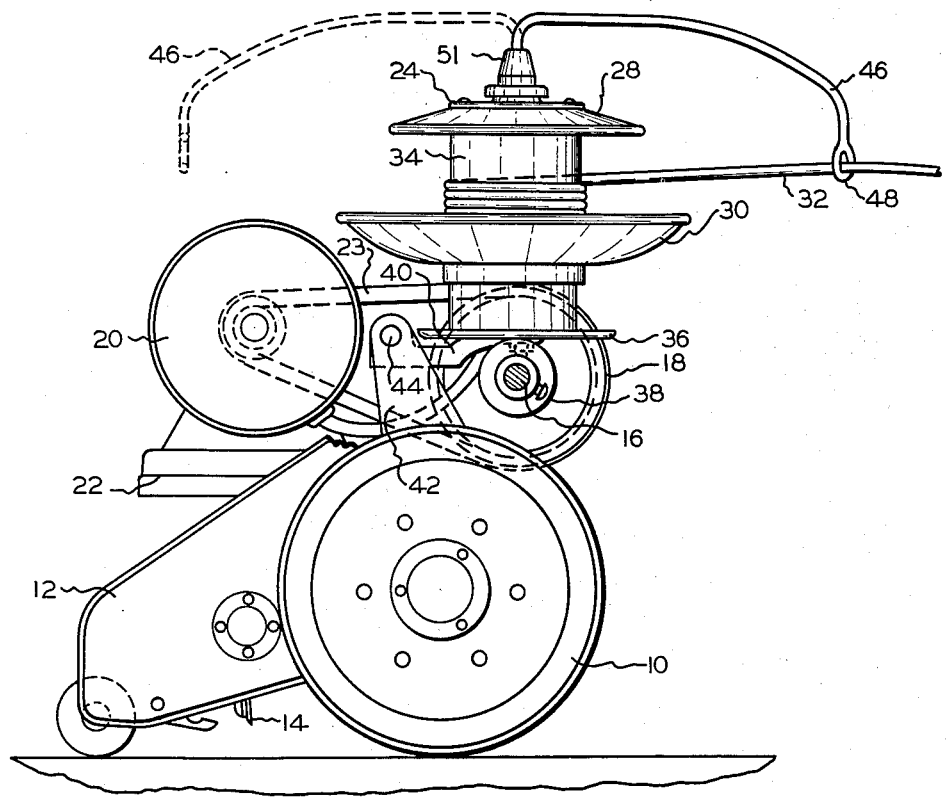
FIG. I.
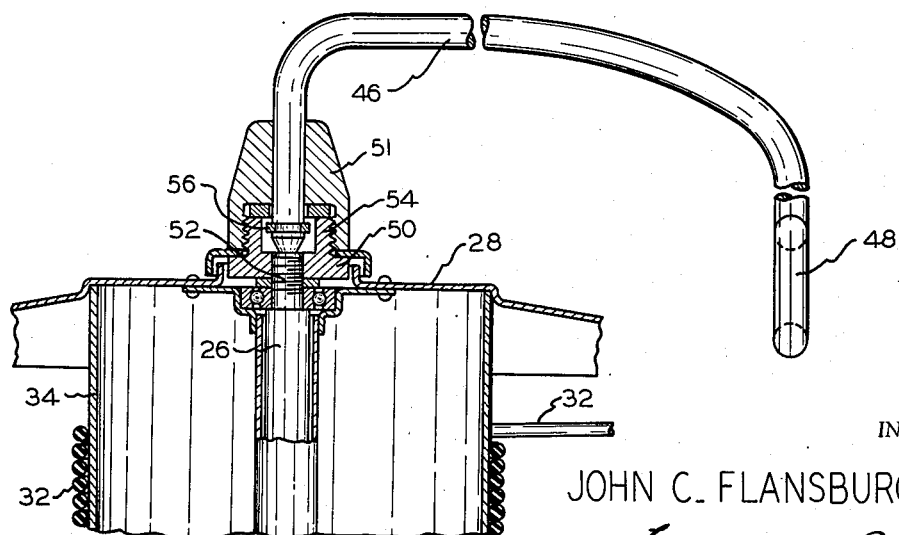
FIG. II.
INVENTOR
JOHN C. FLANSBURGH
BY Townsend F. Beaman
ATTORNEY Patented Jan. 13, 1953

2,625,344

UNITED STATES PATENT OFFICE 2,625,344

ELECTRIC CORD HANDLING APPARATUS

John C. Flansburgh, Michigan Center, Mich., assignor to Yard-Man, Inc., Jackson, Mich., a corporation of Michigan Application March 8, 1950, Serial No. 148,394

2 Claims. (Cl. 242—128)

The present invention relates to electric cord handling apparatus, being particularly adapted to cord reels for electrically driven lawn mowers and the like. Reference may be had to application, Serial No. 129,485 filed November 25, 1949, for a disclosure of a similar device over which this invention is considered to have certain advantages.

In electric cord reels for supplying the current to motor driven lawn mowers, floor or lawn sweepers, floor sanders and similar apparatus, it is convenient to drive the reel in one direction by a non-positive drive, to reel in the slack cord, with the reel being supported for bodily movement and the drive being effected upon such bodily movement. At the time the cord is being unwound from the reel with this arrangement, the tension on the cord must overcome the drive.

It has been found in practice that in the manipulation of the cord as disclosed in the aforesaid application, some operational conditions arise which may more conveniently handled by supporting the arm carrying the cord guiding eye for full swiveling movement. Where the full swiveling arm is used upon a reel supported for pivotal movement toward a drive roll, by mounting the arm upon the reel so as to exert a lever action, the weight and tension of the cord may be employed to assist in maintaining the drive as well as overcome the same.

Thus, one of the objects of the invention is to provide an improved cord handling device for electrically driven apparatus of the type described.

Another object is to provide a cord reel having a full swiveling cord guide member.

Another object of the invention is to provide an electric cord reel supported for rotation about a substantially vertical axis with a full swiveling cord guide arm for supporting and guiding the cord as it is wound and unwound.

A further object is to provide, in combination with a driven cord reel supported for bodily movement to alter the effectiveness of its drive, a cord supporting and guide member which exerts an influence upon the bodily movement of the reel with respect to its drive.

A still further object is to provide an improved electric cord reel mechanism in which the reel is driven about a vertical axis to take up slack cord wherein a cord guiding and supporting arm is supported from the reel and acts as a lever under the influence of cord weight and tension to influence the drive of the reel.

These and other objects and advantages residing in the details and arrangement of construction will appear from a consideration of the following specification and claims.

In the drawing:

Fig. 1 is a side elevational view partly shown in broken section of a lawn mower to which the invention has been applied, and Fig. 2 is an enlarged detail, partly shown in vertical cross section, of the cord supporting and guiding member.

The principles of the invention have been conveniently illustrated as applied to the electric cord reel of the construction disclosed in the aforesaid application in which the lawn mower comprises ground wheels 10, spaced in the frame 12 in which a revolving cutting reel 14 is located. Supported in the frame 12 is a counter shaft 16 bearing a pulley 18 driven from the electric motor 20 on the platform 22 by the belt 23. By belts and pulleys, not shown, the cutting reel 14 and wheels 10 are driven from the shaft 16.

As more fully shown in the aforesaid application, the cord reel 24 is supported for rotation about a substantial vertical shaft 26. Upper and lower flanges 28 and 30 confine the cord 32 being wound upon the hub 34. The lower portion of the reel 24 includes a drive flange 36 with which the drive roll 38 on the shaft 16 engages to rotate the reel 24 in one direction to take up slack cord.

Shaft 26 is rigidly connected to the member 40 pivotally supported between the spaced brackets 42 on the bolt 44. With this arrangement the weight of the reel 24 tends to rotate the whole assembly about the axis of the bolt 44 to maintain the roll 38 and flange 36 in frictional driving contact.

The cord guiding and supporting arm 46 is supported from the fixed shaft for arcuate movement and preferably for full swivel movement although certain advantages of the invention may be obtained when less than complete rotation is provided. An eye 48 is provided at the outer end of the arm 46 to provide a running guide and support for the cord 32. To support the arm 46 for full swivel movement, the arrangement illustrated comprises an adaptor nut 50 threaded at 52 upon the upper end of the shaft 26. A vertical bearing for the arm is provided by a sleeve nut 51 threaded upon a reduced threaded portion 54 of the nut 50. A snap ring 56 located in a groove (not shown) in the arm 46 prevents vertical withdrawal of the arm 46 from its bearing.

With the arm 46 arranged as above described, the eye 48 and arm 46 will tend to assume a position parallel to the line of tension upon the cord 32 upon reeling as well as unreeling. This avoids an excessive drag on the cord that might otherwise result upon bending the cord 32 through the eye 48. At the time slack cord is being wound upon the reel 24, the arm 46 will assume some position forward of the axis of the bolt 44 with the result that the weight and tension of the cord 32 on the eye 48 will act through the arm 46 as a lever to increase the pressure between the friction drive members 36 and 38. When the cord 32 is being unwound from the reel 24 and the reel is being rotated against the direction of drive of the roll 38, the arm 46 will assume a position disposing the eye 48 rearwardly of the axis of the bolt 44, as shown in dotted outline in Fig. 1, with the result that the weight and tension of the cord 32 on the eye 48 will tend to rock the reel 24 counter-clockwise to reduce the effectiveness of the engagement between the roll 38 and flange 36. Thus, the tension on the cord 32 required to unwind the same from the roll 24 is reduced yet any tendency to overrun is avoided.

I claim:

1. In combination, a driving roll, an electric cord reel having a driven flange, means supporting said reel for rotary movement about a substantially vertical axis to reel and unreel the cord and for bodily pivotal movement about a substantially horizontal axis to bring said driven flange on the reel into frictional engagement with the driving roll, a cord guiding and supporting arm carried upon said reel and supported at its inner end for swiveling movement about a substantially vertical axis in the proximity of the axis of rotation of said reel, said arm having a horizontally extending portion disposed above the reel and terminating in an outer end portion to receive and guide the cord, said outer end portion being disposed forwardly of said horizontal axis when in a cord reeling position and rearwardly of said horizontal axis when in a cord unreeling position whereby the moment of the weight and tension of the cord acts through said arm and influences the effectiveness of the friction drive between said flange and drive roll.

2. In the combination of claim 1 wherein said cord guiding and supporting arm is supported for complete rotation about said vertical axis.

JOHN C. FLANSBURGH.

REFERENCES CITED

The following references are of record in the file of this patent:

UNITED STATES PATENTS

| Number | Name | Date |
| --- | --- | --- |
| 2,158,607 | Bochmann | May 16, 1939 |
| 2,370,922 | Siegenthaler | Mar. 6, 1945 |
| 2,498,609 | Reil | Feb. 21, 1950 |